March 28, 1961 M. A. ANDERSON 2,976,768
MIRROR ASSEMBLY FOR VEHICLE USE
Filed Nov. 17, 1958
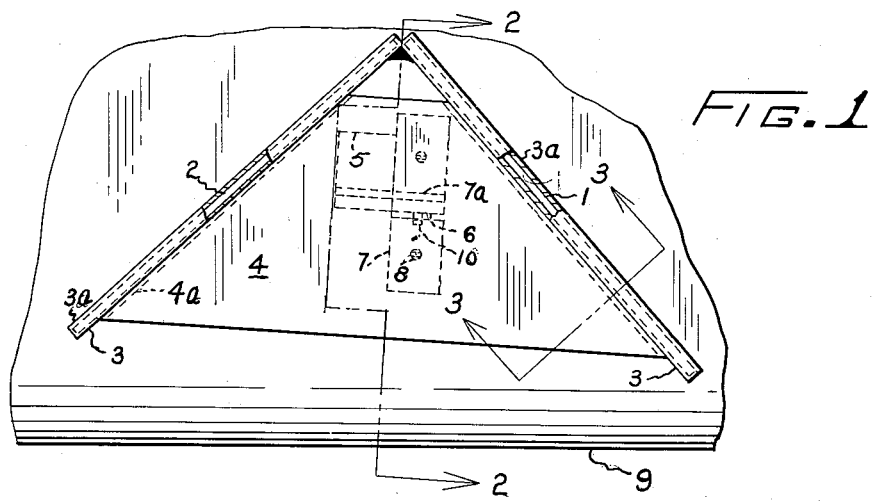
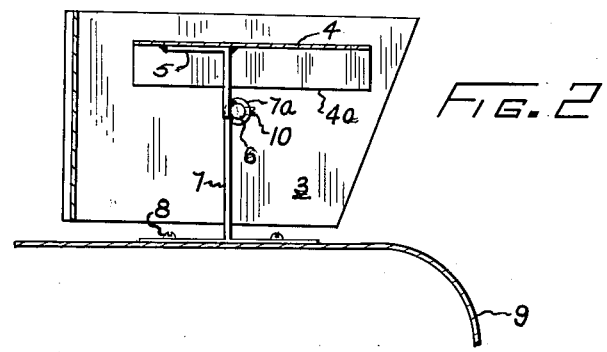
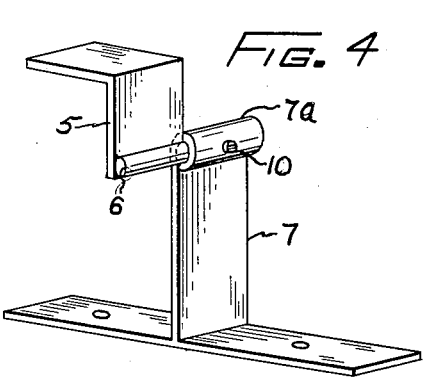
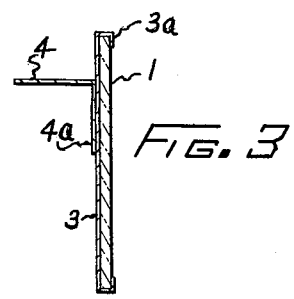
INVENTOR.
MARCUS A. ANDERSON
BY
ATTORNEY

United States Patent Office 2,976,768
Patented Mar. 28, 1961

2,976,768

MIRROR ASSEMBLY FOR VEHICLE USE

Marcus A. Anderson, 20815 Reimanville, Ferndale, Mich.

Filed Nov. 17, 1958, Ser. No. 774,481

1 Claim. (Cl. 88—87)

This invention relates to mirrors for vehicle use and particularly for increasing the scope of vision of a vehicle driver.

An object of the invention is to provide an assembly of two mirrors for installation on the front end of a vehicle to afford convenient observation by the driver, such mirrors having a divergency adapting them, when properly installed, to reflect traffic conditions at opposite sides of said front end and transmit such reflections to the driver's eye.

Another object is to adapt said assembly to be tilted about an axis transverse to the vehicle and to be retained in selective positions of such tilting, thus compensating for any difference in level between the mirror assembly and the driver's eye.

Another object is to dispose the two divergent mirrors in such close proximity as to permit both thereof to be readily viewed by the driver.

These and various other objects are attained by the construction hereinafter described and illustrated in the accompanying drawing, wherein:

Fig. 1 is a top plan view of the assembly as installed on a motor vehicle hood.

Fig. 2 is a vertical sectional view of the same, taken on the line 2—2 of Fig. 1.

Fig. 3 is a sectional view of one of the mirrors and its backing plate, on the line 3—3 of Fig. 1.

Fig. 4 is a perspective view of two pivotally interengaged brackets employed in the assembly.

In these views the reference characters 1 and 2 designate two rectangular mirrors, each equipped with a backing plate 3 having marginal flanges 3a engaging the mirror edges to firmly retain the mirror on the plate. The units formed by each mirror and its plate 2 are rigidly interconnected by a substantially triangular plate 4 disposed between said units, transversely to the latter and formed at opposed convergent margins thereof with downturned flanges 4a welded or otherwise rigidly secured to the plates. Said units thus converge at an angle predetermined by the plate 4, such angle being ninety degrees, at least approximately. Preferably the units are, as shown, contiguous at the apex of said angle and the backing plates are preferably welded or otherwise interconnected at said apex. Welded or otherwise rigidly secured to the plate 4 is a downwardly projecting bracket 5, rigidly carrying at its lower end a pivot pin 6 disposed horizontally and transversely to the plane which bisects the angle formed by the units 1, 2. Said pin projects sufficiently beyond the bracket 5 to fit rotatively in a sleeve 7a formed by the rolled upper end of a bracket 7 secured by screws 8 or other fastenings to the forward end portion of a motor vehicle hood 9. Radially mounted in the sleeve 7a is a set screw 10 whereby the mirror units may be held variously tilted about the pin and sleeve axis.

When a motor vehicle in a certain lane enters a street crossing, the driver's vision of approaching cross traffic is often considerably limited by corner buildings or by vehicles in adjoined lanes, so that he may be too late in realizing an impending danger of collision. Also, the driver must turn his head first to one side and then to the other to take note of cross traffic, and hence cannot give proper attention to conditions prevailing directly in the path of his vehicle. Pedestrians crossing a street are likely to be struck by a car if its driver is limited as to lateral vision by another car traveling in the same direction. The described mirror assembly reduces the requisite advance of a car into a street intersection prior to full observation of approaching cross traffic. Also, said assembly permits a driver to observe cross traffic without unduly detracting from observation of conditions existing directly ahead of the car. By expediting perception of a hazard arising from cross traffic, the described assembly increases the time available for applying brakes or a steering control, in case either of such controls are necessary.

The driver's eye is generally about eighteen inches to the left of the longitudinal central vertical plane of the vehicle, whereas the preferred installation of the mirror assembly is substantially in said plane. The mirrors are preferably so installed that the vertical plane bisecting the angle formed by the mirrors will extend substantially to a point determined by the average driver's eye.

The driver's eye is ordinarily at a level considerably above the level determined by the point of installation of the mirror assembly. The difference in these levels varies in amount on different cars and may vary materially for different drivers. The pivotal adjustment afforded by the pin 6 permits of compensation for such difference of levels, affording such upward tilting of the mirror units at their apex ends as to afford observation by a driver of traffic conditions prevailing in directions lateral to the front end of a car.

What I claim is:

A mirror assembly for vehicle use, comprising two mirrors, each having a reflecting front face, such faces converging at an angle approximating ninety degrees, and said mirrors having mutually confronting rear faces, a plate transverse to and rigidly interconnecting said mirrors, a bracket for installation on the forward end portion of a vehicle, a second bracket extending rigidly downward from said plate, means for mounting the second bracket at its lower end on the first bracket to pivot about an axis transverse to the plane bisecting said angle, and means for maintaining selective pivotal positions of the mirrors and second bracket about said axis, said plate occupying a covering relation to said brackets and mounting means.

References Cited in the file of this patent

UNITED STATES PATENTS

| | | |
|---|---|---|
| 1,135,446 | Fellowes | Apr. 13, 1915 |
| 1,562,335 | Jones | Nov. 17, 1925 |
| 1,946,230 | Mosberg | Feb. 6, 1934 |
| 2,174,768 | Turkel | Oct. 3, 1939 |

FOREIGN PATENTS

| | | |
|---|---|---|
| 634,845 | France | Dec. 9, 1927 |
| 98,218 | Sweden | Dec. 28, 1939 |
| 517,716 | Great Britain | Feb. 7, 1940 |